(12) United States Patent
Tredoux et al.

(10) Patent No.: US 9,485,203 B2
(45) Date of Patent: Nov. 1, 2016

(54) METHOD AND SYSTEM FOR ATTACHING SCANNED DOCUMENTS TO EMAIL REPLIES VIA A MOBILE COMMUNICATIONS DEVICE

(71) Applicant: Xerox Corporation, Norwalk, CT (US)

(72) Inventors: Gavan Tredoux, Penfield, NY (US); Premkumar Rajendran, Pondicherry (IN)

(73) Assignee: Xerox Corporation, Norwalk, CT (US)

( * ) Notice: Subject to any disclaimer, the term of this patent is extended or adjusted under 35 U.S.C. 154(b) by 309 days.

(21) Appl. No.: 13/762,574

(22) Filed: Feb. 8, 2013

(65) Prior Publication Data

US 2014/0229550 A1    Aug. 14, 2014

(51) Int. Cl.
*G06F 15/16* (2006.01)
*H04L 12/58* (2006.01)

(52) U.S. Cl.
CPC ..................... *H04L 51/08* (2013.01)

(58) Field of Classification Search
USPC ....................................... 709/206; 358/1.15
See application file for complete search history.

(56) References Cited

U.S. PATENT DOCUMENTS

| | | | |
|---|---|---|---|
| 6,970,697 B2 | 11/2005 | Kouznetsov et al. | |
| 7,773,120 B2 | 8/2010 | Simon | |
| 7,840,207 B2 | 11/2010 | Adams et al. | |
| 8,126,966 B2 | 2/2012 | Dote et al. | |
| 2005/0231757 A1* | 10/2005 | Matsuda | H04L 12/5855 358/1.15 |
| 2006/0085509 A1* | 4/2006 | Wener | 709/206 |
| 2006/0248579 A1* | 11/2006 | Gerritsen | G06Q 10/107 726/9 |
| 2009/0161158 A1* | 6/2009 | Fujikawa | H04L 12/5835 358/1.15 |
| 2009/0164596 A1* | 6/2009 | Sakiyama | 709/206 |
| 2009/0287777 A1 | 11/2009 | Bhogal et al. | |
| 2010/0157349 A1* | 6/2010 | Hong | 358/1.14 |
| 2010/0309504 A1 | 12/2010 | Partridge et al. | |
| 2010/0309505 A1* | 12/2010 | Partridge et al. | 358/1.15 |
| 2012/0050823 A1* | 3/2012 | Khawaja et al. | 358/474 |
| 2012/0110092 A1* | 5/2012 | Keohane | G06Q 10/107 709/206 |
| 2012/0140267 A1* | 6/2012 | Lee et al. | 358/1.15 |
| 2013/0286417 A1* | 10/2013 | Patara | 358/1.13 |
| 2014/0029032 A1* | 1/2014 | Hilbert et al. | 358/1.13 |

* cited by examiner

*Primary Examiner* — Nicholas Taylor
*Assistant Examiner* — Sanjoy Roy
(74) *Attorney, Agent, or Firm* — Kermit D. Lopez; Luis M. Ortiz; Ortiz & Lopez, PLLC (57) ABSTRACT

A method and system for attaching a scan to an email reply utilizing a mobile communications device and any standard email client. A scan-to-email attachment module can be configured in association with the mobile communications device. A contact address can be added to a list of email contacts available via the mobile communications device. The contact address can be added by the user to a reply-to email as an additional address utilizing the mobile communications device so that a scan document can be sent as an attachment to an email address listed in the reply-to email. A server monitoring the contact address can be polled by the scan-to-email attachment module and a scan request initiated with respect to a scanner. An email client on the mobile communications device sends the scan document as an attachment to an email address listed in the reply-to email composed by the user. A fresh email can also be composed and the contact address can be added so that the email containing the scan document can be sent to the recipients.

20 Claims, 4 Drawing Sheets

METHOD AND SYSTEM FOR ATTACHING SCANNED DOCUMENTS TO EMAIL REPLIES VIA A MOBILE COMMUNICATIONS DEVICE

TECHNICAL FIELD

Embodiments are generally related to mobile communications devices, such as, for example, Smart phones, cellular phones, personal digital assistants (PDAs), pad computing devices, laptop computers, and the like. Embodiments also relate to the attachment of scanned data to email replies.

BACKGROUND OF THE INVENTION

Scans (e.g., scanned data, scanned files, etc.) can be attached to an email in reply to another email, such as, for example, a query regarding a document. Conventionally, acquiring and attaching the scan to the email is a cumbersome process requiring many steps, which is inconvenient for a user. For example, the user may be forced to walk up to a scanner, scan the document to a network folder, walk back to a computer, compose an email in reply to the original email, attach the document from a network location, and then send the email. Such additional steps reduce the usability and raise everyday costs associated with, for example, conducting business, thereby reducing efficiency.

Based on the foregoing, it is believed that a need exists for an improved method and system for attaching a scan to an email reply, as will be described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method and system for configuring a mobile communications device.

It is another aspect of the disclosed embodiments to provide for an improved method and system for attaching a scan (e.g., scanned data, scanned files, etc.) to an email reply utilizing a mobile communications device.

The aforementioned aspects and other objectives and advantages can now be achieved as described herein. A method and system for attaching scan to an email reply utilizing a mobile communications device is disclosed herein. A scan-to-email attachment module can be configured in association with the mobile communications device and a contact address can be added to a list of email contacts available on the mobile communications device. The contact address can be added to a reply-to email as an additional address utilizing the mobile communications device so that a scan document can be sent as an attachment to an email address listed in the reply-to email. The scan-to-email attachment module can poll a server monitoring the contact address and a scan request can be initiated to a scanner. An email client on the mobile communications device sends the scan document as an attachment to an email address listed in the reply-to email composed by the user. A fresh email can also be composed and the contact address can be added so that the email containing the scan document can be sent to the recipients.

The contact address can be monitored by the server hosted, for example, on the Internet and the email client on the mobile communications device communicates with the scan-to-email attachment module through the contact address. The scan-to-email attachment module can be easily integrated with a number of mobile platforms without requiring any changes to the email client used on the mobile communications device. The scan document can be attached to a follow-up email and the user can receive the email after the first email containing the contact address. The second email can be delivered to a recipient as a payload email. Such an approach automatically detects a desire to attach the scanned document to the email sent in reply to another email utilizing the mobile communications device establishing ease of use.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one of skill in the art, the present invention can be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 1:
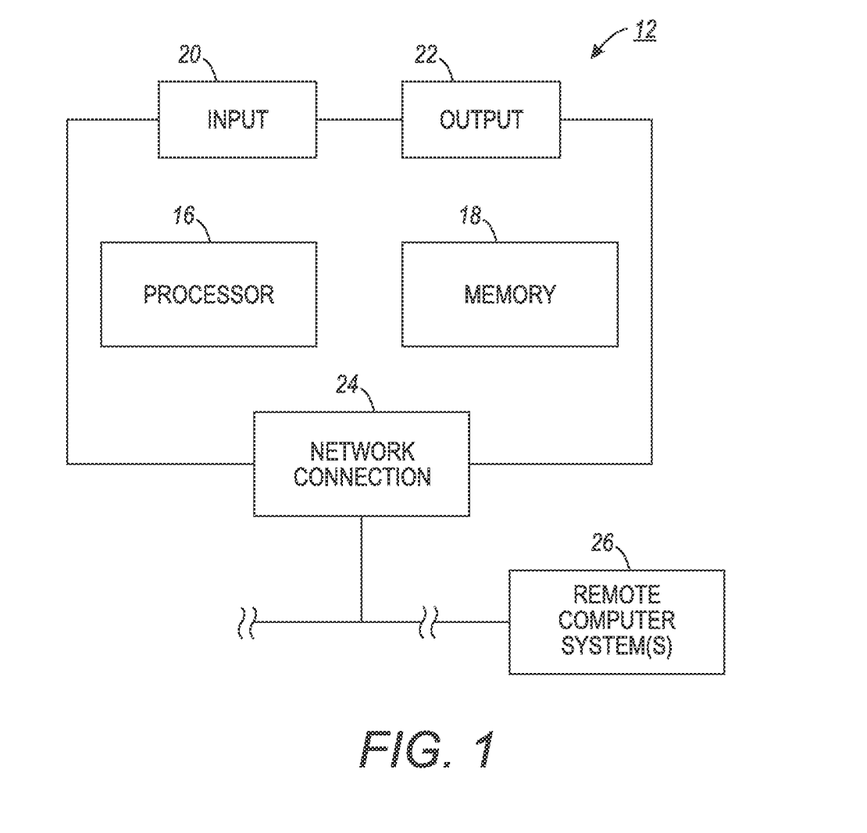
FIG. 1 illustrates a schematic view of a computer system, which can be implemented in accordance with the disclosed embodiments.
Figure 2:
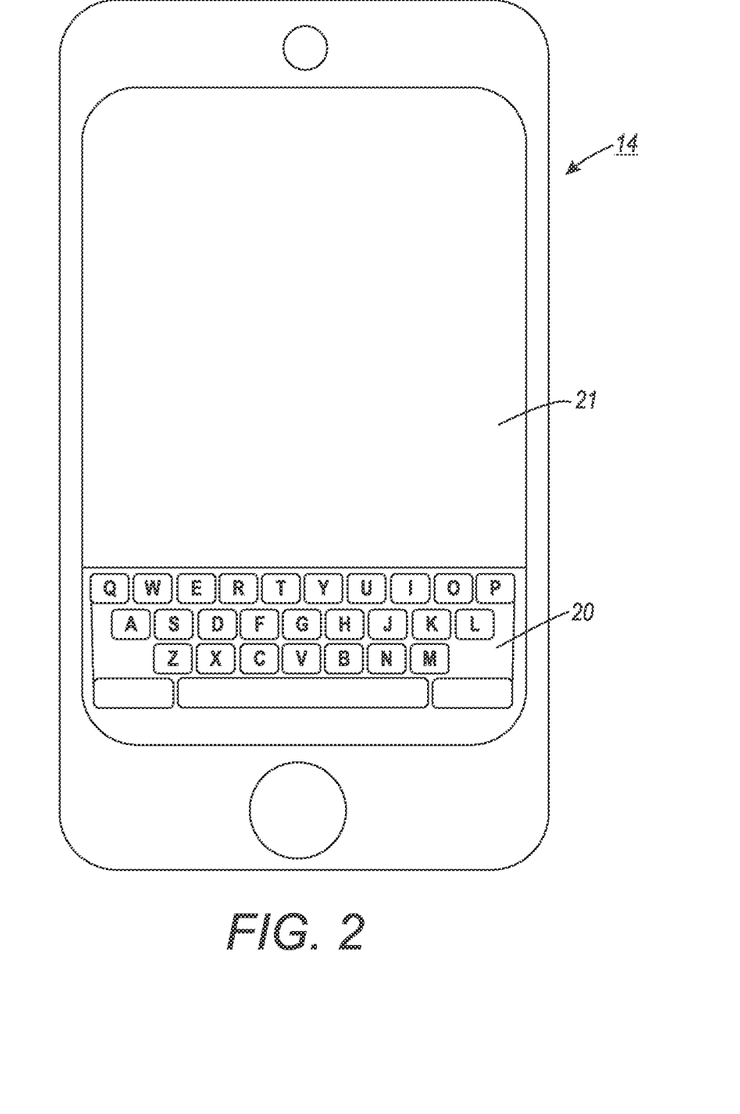
FIG. 2 illustrates a schematic view of a software system including a scan-to-email attachment module, an operating system, and a user interface, in accordance with the disclosed embodiments.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

FIG. 1 is a block diagram of a data-processing system 12 that can be used in certain embodiments of the present technology. The illustrative system 12 shown in FIG. 1 generally includes a device 14 having a processor 16, a memory 18, one or more input peripherals 20, and one or more output peripherals 22. System 12 may also include a network connection 24, and communication with one or more remote computers 26 via the network connection 24.

In some embodiments, the illustrative device 14 may be a Smartphone or a tablet computer, although any other consumer electronic device such as a laptop computer, server, desktop computer, gaming counsel, and forth can be used to implement device 14. The processor 16 can be a microprocessor, and the processor's operation can be controlled, in part, by information stored in the memory 18, such as operating system software, application software (e.g., "apps"), data, etc. The memory 18 may comprise flash memory, a hard drive, etc.

The input peripherals 20 may include, for example, a camera, a microphone, hardware input keys, etc. The peripherals (or device 14 itself) may also include an interface system by which analog signals sampled by the camera/microphone are converted into digital data suitable for processing by the system. Other input peripherals can include a touch screen, keyboard, etc. The output peripherals 22 can include a display screen, speaker, etc. The network connection 24 can be wired (e.g., Ethernet, etc.), wireless (WiFi, 4G, Bluetooth, etc.), or both.

In an exemplary operation, device 14 can receive a set of digital content data, such as through input 20 and an interface thereof, through the network connection 24, or otherwise. The content data may be of any type; audio is exemplary. The system 12 processes the digital content data to generate corresponding identification data. This may be done, e.g., by applying a digital watermark decoding process, or a fingerprinting algorithm—desirably to data representing the sonic or visual information itself, rather than to so-called "out-of-band" data (e.g., file names, header data, etc.). The resulting identification data serves to distinguish the received content data from other data of the same type (e.g., other audio or other video).

By reference to this identification data, the system determines corresponding software that should be invoked. One way to do this is by indexing a table, database, or other data structure with the identification data, to thereby obtain information identifying the appropriate software. In some instances the data structure may return identification of a single software program. In that case, this software is launched—if available. (Availability does not require that the software be resident on the device. Cloud-based apps may be available.) If not available, the software may be downloaded (e.g., from an online repository, such as the iTunes store), installed, and launched. (Or, the device can subscribe to a software-as-service cloud version of the app.) Involvement of the user in such action(s) can depend on the particular implementation: sometimes the user is asked for permission; in other implementations such actions proceed without disturbing the user.

Sometimes the data structure may identify several different software programs. The different programs may be specific to different platforms, in which case, device 12 may simply pick the program corresponding to that platform (e.g., Android G2, iPhone 4, etc.). Or, the data structure may identify several alternative programs that can be used on a given platform. In this circumstance, the device may check to determine which—if any—is already installed and available. If such a program is found, it can be launched. If two such programs are found, the device may choose between them using an algorithm (e.g., most-recently-used; smallest memory footprint; etc.), or the device may prompt the user for a selection. If none of the alternative programs is available to the device, the device can select and download one—again using an algorithm, or based on input from the user. Once downloaded and installed, the application can be launched.

Note that the device may already have an installed application that is technically suited to work with the received content (e.g., to render an MPEG4 or an MP3 file). For certain types of operations, there may be dozens or more such programs that are technically suitable. However, the content may indicate that only a subset of this universe of possible software programs should be used.

Software in the device 14 may strictly enforce the content-identified software selection. Alternatively, the system may treat such software identification as a preference that the user can override. In some implementations the user may be offered an incentive to use the content-identified software. Or, conversely, the user may be assessed a fee, or other impediment, in order to use software other than that indicated by the content.

Sometimes the system may decline to render certain content on a device (e.g., because of lack of suitable app or hardware capability), but may invite the user to transfer the content to another user device that has the needed capability, and may implement such transfer. Instead of absolutely declining to render the content, the system may render it in a limited fashion. For example, a video might be rendered as a series of still key frames (e.g., from scene transitions). Again, the system can transfer the content where it can be more properly enjoyed, or—if hardware considerations permit (e.g., screen display resolution is adequate)—needed software can be downloaded and used.

FIG. 2 illustrates an example computing device 14 that may be utilized in accordance with the disclose embodiments. As shown in FIG. 2, computing device 14 is implemented as a Smartphone having a display screen 21 that includes an input area 20, in this case a graphically displayed keyboard for inputting data to computing device 14.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

FIGS. 1-2 are thus intended as examples, and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Figure 3:
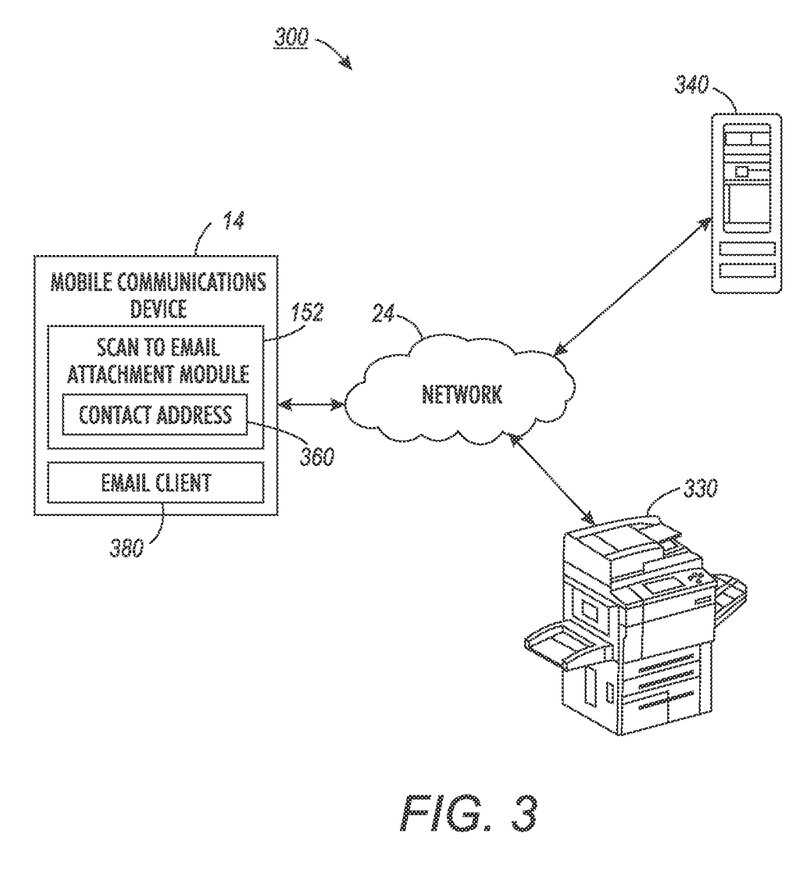
FIG. 3 illustrates a block diagram of a scan-to-email attachment system, which can be implemented in accordance with a preferred embodiment.

FIG. 3 illustrates a block diagram of a scan-to-email attachment system 300, in accordance with the disclosed embodiments. Note that in FIGS. 1-4, identical or similar blocks are generally indicated by identical reference numerals. For example, the same computing device 14 shown in FIG. 1 is also included in the context of the system 300 shown in FIG. 3. The scan-to-email attachment system 300 thus generally includes the mobile communications device 14 and other components, such as, for example an MFD (Multi-Function Device) 330, a server 340 and one or more other computing devices (if necessary). MFD 330, server 340, and device 14 can communicate via network 24. Note that the network 24 may employ any network topology, transmission medium, or network protocol.

The network 24 may include connections, such as wire, wireless communication links, or fiber optic cables. Network 24 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. In some configurations, network 24 may also be a wireless computer network, such as, for example, a cellular communications network, an IEEE 802.11x type network, WLAN, etc.

The mobile communications device 14 can be configured to include a scan-to-email attachment module 152 that assists in scan-to-email operations via device 14. The scan-to-email attachment module 152 can add or include contact address 360 to or with a list of email contacts available on the mobile communications device 14. The user adds the contact address 360 to a reply-to email as an additional address utilizing the mobile communications device 14 so that a scan document can be sent as an attachment to the other email addresses listed in the reply-to email.

The server 340 monitors the contact address 360 and the scan-to-email attachment module 152 polls the server 340 and, when an email is received at the contact address 360 monitored by 340, initiates a scan request to the MFD 330. An email client 380 on the mobile communications device 14 sends the scanned document as an attachment to an email address listed in the reply-to email composed by a user. A fresh email can also be composed and the contact address 360 can be added so that the email containing the scanned document can be sent to the recipients.

The contact address 360 can be named for example, "Attach Scan". When replying to an email utilizing the mobile communications device 14, the user may add the "Attach Scan" contact to the reply-to email as an additional address to indicate intent by a user to send the scan to the email addresses listed in the reply-to email, typically the source of the original email. The server 340 hosted, for example, on the internet monitors the contact address 360.

The email client 380 associated with the mobile communications device 14 can transmit an email and access or utilize the email contact address 360. The scan-to-email attachment module 152 can be easily integrated with a number of mobile platforms without requiring any changes to the email client 380 employed on the mobile communications device 14. The scan document can be attached to a follow-up email, and the user can receive the email after the first email containing the contact address 360. The second email can be delivered to the recipient as a payload email.

For example, the attached document can be sent as an email by the scan-to-email attachment module 152 on the mobile communications device 14, after retrieving the document from the MFD 330. Alternatively, the MFD 330 may deliver the scanned document to the server 340, for example, HTTP or FTP, and the server 340 then composes and delivers the email. Alternatively, the mobile communications device 14 may send the scan to the server 340, which can be then delivered as an email. Moreover, the server 340 can be for example, a notification server or a separate server. The system 300 automatically detects the desire to attach the scanned document to the email sent in reply to another email using the mobile communications device 14 establishing ease of use.

Figure 4:
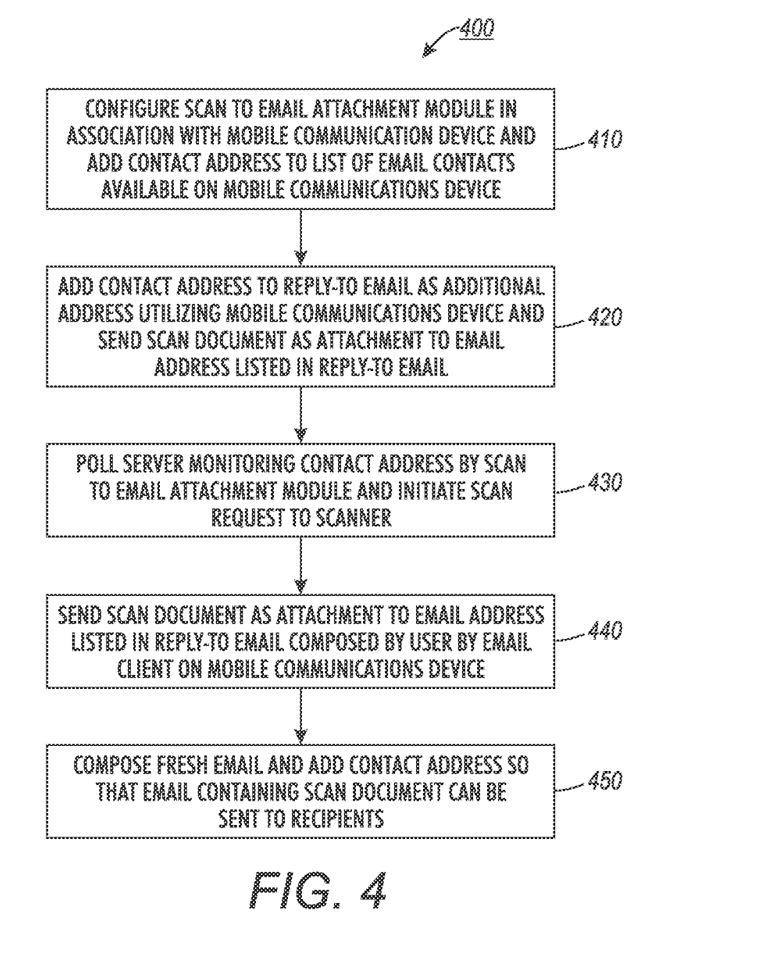
FIG. 4 illustrates a high level flow chart of operations illustrating logical operational steps of a method for attaching a scan to an email reply utilizing a mobile communications device, in accordance with an alternative embodiment.

FIG. 4 illustrates a high level flow chart of operations illustrating logical operational steps of a method 400 for attaching scan to an email reply utilizing the mobile communications device 14, in accordance with a preferred embodiment. Initially, as indicated at block 410, the scan-to-email attachment module 152 can be configured in association with the mobile communications device 14 and the contact address 360 can be added to a list of email contacts available on the mobile communications device 14. The contact address 360 can be added to the reply-to email as an additional address utilizing the mobile communications device 14 so that the scan document can be sent as an attachment to an email address listed in the reply-to email, as shown at block 420.

The scan-to-email attachment module 152 can poll the server 340 monitoring the contact address 360 and the scan request can be initiated to the MFD 330, as illustrated at block 430. The email client 380 on the mobile communications device 14 sends the a scan document as an attachment to the email address listed in the reply-to email composed by the user, as depicted at block 440. A fresh email can also be composed and the contact address 360 can be added so that the email containing the scan document can be sent to the recipients, as shown at block 450. The system 300 automatically detects the desire to attach the scanned document, and orchestrates the scanning and delivery process establishing ease of use.

Based on the foregoing, it can be appreciated that a number of embodiments, preferred and alternative, are disclosed herein. For example, in one embodiment, a method is disclosed for attaching scan (e.g., a scanned document such as PDF, TIFF, JPEG, etc.) to an email reply. Such a method can include steps or logical operations such as, for example, adding a contact address to a reply-to-email as an additional address utilizing a mobile communications device so that a scanned document is capable of being sent as an attachment to an email address listed in the reply-to email, polling a server monitoring the contact address to thereafter initiate a scan request, and transmitting the scanned document as an attachment to the email address listed in the reply-to-email via an email client associated with the mobile communications device.

In another embodiment, steps or logical operations can be implemented for composing a new email, and adding the contact address so that the new email containing the scan document is sent to the recipient. In yet another embodiment, a step or logical operation can be implemented for monitoring the contact address by the server wherein a user communicates with a scan-to-email attachment module through the contact address. In still another embodiment, a step or logical operation can be implemented for integrating the scan-to-email attachment module with a plurality of mobile platforms.

In other embodiments, steps or logical operations can be provided for attaching the scanned document to a subsequent email so that the email is capable of being received after a prior email containing the contact address, and delivering the subsequent email to a recipient as a payload email. In yet other embodiments, steps or logical operations can be implemented for monitoring the contact address by the server wherein a user communicates with a scan-to-email attachment module through the contact address, and integrating the scan-to-email attachment module with a plurality of mobile platforms. In some embodiments, the aforementioned mobile communications device can be, for example, a Smartphone, a pad computing device, a laptop computer, etc.

In another embodiment, a system for attaching a scan to an email reply can be implemented. Such a system can include, for example, a processor, a data bus coupled to the processor, and a computer-usable medium embodying computer program code, the computer-usable medium being coupled to the data bus. The computer program code can include instructions executable by the processor and configured, for example, for adding a contact address to a reply-to-email as an additional address via a mobile communications device so that a scanned document is capable of being sent as an attachment to an email address listed in the reply-to email polling a server monitoring the contact address to thereafter initiate a scan request, and transmitting the scanned document as an attachment to the email address listed in the reply-to-email via an email client associated with the mobile communications device.

In another embodiment, such instructions can be further configured for composing a new email, and adding the contact address so that the new email containing the scan document is sent to the recipient. In yet another embodiment, such instructions can be further configured for monitoring the contact address by the server wherein a user communicates with a scan-to-email attachment module through the contact address. In other embodiments, such instructions can be further configured for integrating the scan-to-email attachment module with a plurality of mobile platforms. In still other embodiments, such instructions can be further configured for attaching the scanned document to a subsequent email so that the email is capable of being received after a prior email containing the contact address, and delivering the subsequent email to a recipient as a payload email.

In another embodiment, such instructions can be further configured for monitoring the contact address by the server wherein a user communicates with a scan-to-email attachment module through the contact address, and integrating the scan-to-email attachment module with a plurality of mobile platforms.

In still another embodiment, a processor-readable medium storing computer code representing instructions to cause a process for attaching a scan to an email reply can be implemented. Such computer code can include code to add a contact address to a reply-to-email as an additional address utilizing a mobile communications device so that a scanned document is capable of being sent as an attachment to an email address listed in the reply-to email, poll a server monitoring the contact address to thereafter initiate a scan request, and transmit the scanned document as an attachment to the email address listed in the reply-to-email via an email client associated with the mobile communications device.

In other embodiments, such code can further comprise code to compose a new email, and add the contact address so that the new email containing the scan document is sent to the recipient. In yet other embodiments, such code can further include code to monitor the contact address by the server wherein a user communicates with a scan-to-email attachment module through the contact address. In still other embodiments, such code can include code to integrate the scan-to-email attachment module with a plurality of mobile platforms. In still other embodiments, such code can include code to attach the scanned document to a subsequent email so that the email is capable of being received after a prior email containing the contact address, and deliver the subsequent email to a recipient as a payload email.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. An improved method for attaching a scanned document to an email reply with a client device comprising a mobile communications device, said method comprising:
   associating a scan-to-email attachment module with a mobile communications device comprising a client device in a client-server network that includes at least one server, said scan-to-email attachment module residing in a memory of said client device, said client device having an email client that is operably connected to said scan-to-email attachment module and which also resides in said memory of said client device, said scan-to-email attachment module including a plurality of contact addresses, wherein said scan-to-email attachment module is integratable with a number of different mobile platforms without requiring any changes to said email client employed on said mobile communications device;
   adding a contact address among said plurality of contact addresses to a reply-to-email as an additional address utilizing said mobile communications device so that said scanned document is capable of being sent as an attachment to an email address listed in said reply-to email as facilitated by said scan-to-email attachment module;
   polling said at least one server via said scan-to-email attachment module after said adding said contact address among said plurality of contact addresses to said reply-to-email as an additional address, wherein said at least one server comprises a server that monitors said contact address after adding said contact address to said reply-to-email as an additional address;
   initiating a scan request to a scanner for said scanned document, if an email is received at said contact address monitored by said server and after polling said server; and
   transmitting said scanned document as an attachment to said email address listed in said reply-to-email via said email client operably connected to said scan-to-email attachment module on said mobile communications device.

2. The method of claim 1 further comprising:
   composing a new email; and
   adding said contact address so that said new email containing said scanned document is sent to said recipient.

3. The method of claim 2 further comprising monitoring said contact address by said at least one server wherein a user communicates with said scan-to-email attachment module through said contact address.

4. The method of claim 3 further comprising integrating said scan-to-email attachment module with a plurality of mobile platforms without requiring changes to said email client employed on said mobile communications device.

5. The method of claim 3 further comprising:
   attaching said scanned document to a subsequent email so that said email is capable of being received after a prior email containing said contact address; and
   delivering said subsequent email to a recipient as a payload email.

6. The method of claim 5 further comprising:
   monitoring said contact address by said at least one server wherein a user communicates with said scan-to-email attachment module through said contact address; and
   integrating said scan-to-email attachment module with a plurality of mobile platforms without requiring changes to said email client employed on said mobile communications device.

7. The method of claim 6 wherein said mobile communications device comprises at least one of a Smartphone, a tablet computing device, or a laptop computer and wherein said at least one server comprises a notification server.

8. An improved system for attaching a scanned document to an email reply with a client device comprising a mobile communications device, said system comprising:
   at least one processor;
   a data bus coupled to said at least one processor;
   a scan-to-email attachment module; and
   a non-transitory computer-usable medium embodying computer program code, said computer-usable medium being coupled to said data bus, said computer program code comprising instructions executable by said at least one processor and configured for:
      associating said scan-to-email attachment module with a mobile communications device comprising a client device in a client-server network that includes at least one server, said scan-to-email attachment module residing in a memory of said client device, said client device having an email client that is operably connected to said scan-to-email attachment module and which also reside in said memory of said client device, said scan-to-email attachment module including a plurality of contact addresses, wherein said scan-to-email attachment module is integratable with a number of different mobile platforms without requiring any changes to said email client employed on said mobile communications device;

adding a contact address among said plurality of contact addresses to a reply-to-email as an additional address utilizing said mobile communications device so that said scanned document is capable of being sent as an attachment to an email address listed in said reply-to email as facilitated by said scan-to-email attachment module;

polling said at least one server via said scan-to-email attachment module after said adding said contact address among said plurality of contact addresses to said reply-to-email as an additional address, wherein said at least one server comprises a server that monitors said contact address after adding said contact address to said reply-to-email as an additional address;

initiating a scan request to a scanner for said scanned document, if an email is received at said contact address monitored by said server and after polling said server; and transmitting said scanned document as an attachment to said email address listed in said reply-to-email via said email client operably connected to said scan-to-email attachment module on said mobile communications device.

9. The system of claim 8 wherein said instructions are further configured for:
composing a new email; and
adding said contact address so that said new email containing said scanned document is sent to said recipient.

10. The system of claim 9 wherein said instructions are further configured for monitoring said contact address by said at least one server wherein a user communicates with said scan-to-email attachment module through said contact address.

11. The system of claim 10 wherein said instructions are further configured for integrating said scan-to-email attachment module with a plurality of mobile platforms without requiring changes to said email client associated with said mobile communications device.

12. The system of claim 11 wherein said instructions are further configured for:
attaching said scanned document to a subsequent email so that said email is capable of being received after a prior email containing said contact address;
and delivering said subsequent email to a recipient as a payload email.

13. The system of claim 12 wherein said instructions are further configured for:
monitoring said contact address by said at least one server wherein a user communicates with said scan-to-email attachment module through said contact address; and
integrating said scan-to-email attachment module with a plurality of mobile platforms without requiring changes to said email client associated with said mobile communications device.

14. The system of claim 13 wherein said mobile communications device comprises at least one of a Smartphone, a tablet computing device, or a laptop computer; and wherein said at least one server comprises a notification server.

15. A non-transitory processor-readable medium storing computer code representing instructions to cause an improved process for attaching a scanned document to an email reply with a client device comprising a mobile communications device, said computer code comprising code to:

associate said scan-to-email attachment module with a mobile communications device comprising a client device in a client-server network that includes at least one server, said scan-to-email attachment module residing in a memory of said client device, said client device having an email client that is operably connected to said scan-to-email attachment module and which also resides in said memory of said client device, said scan-to-email attachment module including a plurality of contact addresses, wherein said scan-to-email attachment module is integratable with a number of different mobile platforms without requiring any changes to said email client employed on said mobile communications device;

add a contact address among said plurality of contact addresses to a reply-to-email as an additional address utilizing said mobile communications device so that said scanned document is capable of being sent as an attachment to an email address listed in said reply-to email as facilitated by said scan-to-email attachment module;

poll said at least one server via said scan-to-email attachment module after said adding said contact address among said plurality of contact addresses to said reply-to-email as an additional address, wherein said at least one server comprises a server that monitors said contact address after adding said contact address to said reply-to-email as an additional address;

initiate a scan request to a scanner for said scanned document, if an email is received at said contact address monitored by said server and after polling said server; and transmit said scanned document as an attachment to said email address listed in said reply-to-email via said email client operably connected to said scan-to-email attachment module on said mobile communications device.

16. The processor-readable medium of claim 15 wherein said code further comprises code to:
compose a new email; and
add said contact address so that said new email containing said scanned document is sent to said recipient.

17. The processor-readable medium of claim 16 wherein said code further comprises code to monitor said contact address by said server wherein a user communicates with a scan-to-email attachment module through said contact address.

18. The processor-readable medium of claim 17 wherein said code further comprises code to integrate said scan-to-email attachment module with a plurality of mobile platforms without requiring changes to said email client employed on said mobile communications device.

19. The processor-readable medium of claim 18 wherein said code further comprises code to:
attach said scanned document to a subsequent email so that said email is capable of being received after a prior email containing said contact address; and
deliver said subsequent email to a recipient as a payload email.

20. The processor-readable medium of claim 19 wherein said mobile communications device comprises at least one of a Smartphone, a tablet computing device, or a laptop computer; and wherein said server comprises a notification sever.

* * * * *